Oct. 27, 1959
L. R. McCLEARY
2,910,580
BATTERY LOADING COMPARTMENT FOR PORTABLE
RADIO RECEIVER CASINGS AND THE LIKE
Filed Aug. 5, 1958
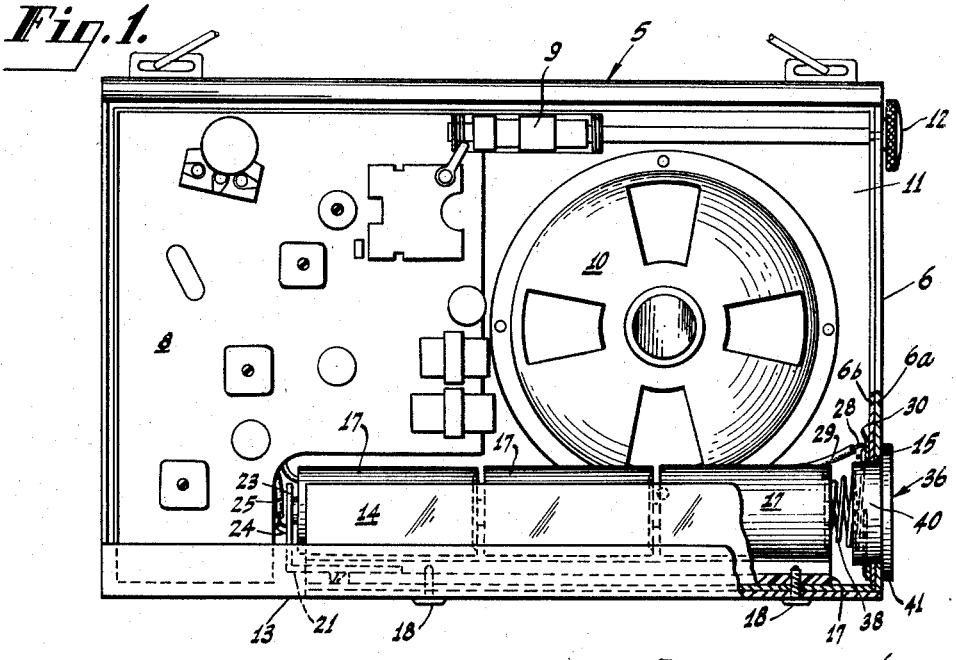
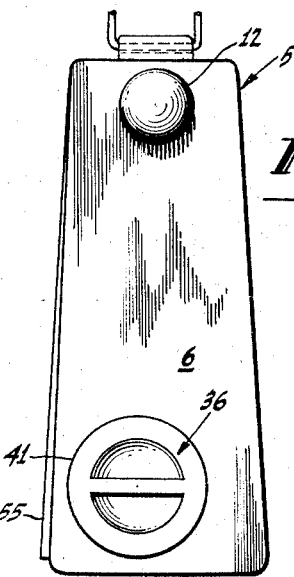
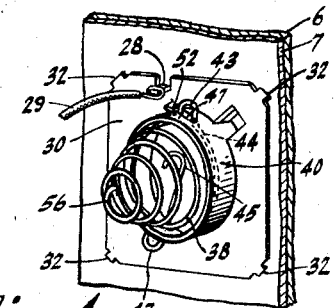
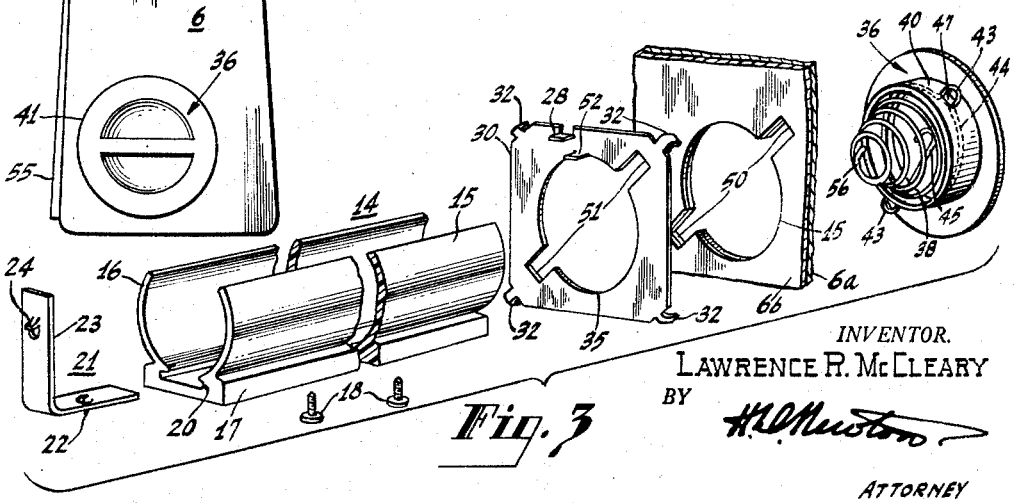
INVENTOR.
LAWRENCE R. McCLEARY
BY
ATTORNEY

United States Patent Office 2,910,580
Patented Oct. 27, 1959

2,910,580

BATTERY LOADING COMPARTMENT FOR PORTABLE RADIO RECEIVER CASINGS AND THE LIKE

Lawrence R. McCleary, Springfield, Pa., assignor to Radio Corporation of America, a corporation of Delaware Application August 5, 1958, Serial No. 753,301

13 Claims. (Cl. 250—14)

The present invention relates to portable radio receivers, and the like, which operate on small battery power from flashlight or similar small dry-cell type batteries carried in the receiver casing. More particularly, the present invention relates to means for mounting and holding a dry-cell type battery, comprising one or more cartridge-like elements, in portable radio receivers and like equipment. Such receivers are generally transistorized and are housed in small plastic or semi-flexible casings. Leather or simulated leather casings with top handles are presently popular.

In battery operated portable radio receivers and the like, flashlight or cartridge type cells have long been used, and the battery of one or more cells is normally located in or on the apparatus chassis and connected in circuit by clips or other terminal means on the ends of flexible battery wires. Furthermore, access to the battery generally is provided through a removable or hinged cover secured by screw or latch means to keep the casing closed tightly against dust and other foreign material that might enter due to its use. Therefore, it is difficult generally to open the casing and to replace the battery units, and there is danger of disturbing the interior equipment and the wiring when this is done.

It is therefore a primary object of this invention to provide an improved battery mounting and holding means for battery operated portable radio receivers and the like, which facilitates replacement of the battery units without opening the casing or disturbing any of the interior equipment or wiring.

Portable radio receivers, particularly of the battery operated type, are carried from place to place and may receive careless handling, therefore battery mounting and holding means for use therein must be rugged and provide reliable contact between the battery terminals and the battery circuits of the apparatus.

It is therefore a further object of this invention to provide an improved battery mounting and holding means which affords firm support for a plurality of battery units or cartridges in end-to-end contacting alignment in a portable radio receiver casing and reliable circuit contact therewith, under all conditions of operation encountered in the use of portable equipment of this type.

In accordance with the invention, the casing of a portable battery operated radio receiver or the like is provided with a battery loading compartment comprising an inner receptacle or holder for a plurality of battery cells or cartridges in end-to-end contacting alignment, and an outer battery loading port for the compartment in one wall of the casing aligned with the receptacle or holder. A cap-like closure means for the loading port locks in place to retain the battery in the holder and provides positive contact with the battery with minimum possibility of increased contact resistance due to wear, corrosion or rough usage. The locking and contact means is a conical or tapered helical compression spring having integral lugs mounted in the closure means. The battery loading compartment construction in accordance with the invention is particularly adapted for use with personal or miniature portable radio receivers of the type having leather or similar semi-rigid walled casings. The contact construction for effectively locking of the cap into the loading port includes a combined reinforcing and contact plate of conducting material which provides electrical contact for the lugs and stiffens the normally semi-rigid wall of the casing in an area about the loading port, and thus facilitates the insertion, and locking and unlocking, of the closure means.

The invention will, however, be further understood from the following description when considered in connection with the accompanying drawing, and its scope is pointed out in the appended claims.

In the drawing,

Figure 1 is a rear elevational view, partly broken away and partly in cross-section, of a portable radio receiver, with the back cover removed, showing a battery loading compartment embodying the invention;

Figure 2 is an end view of the radio receiver of Figure 1 showing an exterior portion of the battery loading compartment;

Figure 3 is an exploded view in perspective, of the battery loading compartment elements of Figures 1 and 2, including a portion of the casing wall, showing the relationship of the various elements in accordance with the invention; and Figure 4 is a similar view in perspective, and partly in section, of certain of the elements of Figure 3 further showing their cooperative relationship in accordance with the invention.

Referring to the drawing, wherein like parts and elements are designated by like reference characters throughout the various figures, and referring particularly to Figures 1 and 2, the receiver or apparatus casing 5, is substantially rectangular in form and is constructed of simulated leather or like semi-rigid material having two layers 6a and 6b, as shown more clearly in Figure 1 for one end wall 6. The layers are cemented or sewed together to make the casing and the walls thereof substantially rigid. The interior of the casing houses the receiver apparatus comprising an equipment chassis 8, a ferrite rod antenna 9, and a loud speaker 10, all mounted against the inner face of the front wall 11. An exterior volume control knob is indicated at 12.

The receiver equipment or other apparatus in the casing is arranged to provide a battery compartment or space along one wall of the casing, such as the lower wall 13, for the battery mounting means in accordance with the invention. The battery compartment may be located along any wall of the casing which has an adjoining wall substantially at a right angle thereto, such as, in the present example, the end wall 6. Between these walls a ready-access battery compartment is provided in the casing, comprising an elongated inner receptacle or holder 14 of tubular form mounted on and secured to the one wall in closely spaced relation to the other adjoining wall and aligned axially with a circular battery loading port 15 therein. The receptacle holds a plurality of duplicate cylindrical battery cells or cartridges 14, which may be of the usual flashlight type, in end-to-end contacting alignment. For this purpose, the port and the receptacle are both of a diameter or size to freely receive the battery units, that is, slightly greater than the diameter of the battery units used in the apparatus.

Referring now to Figure 3 along with Figures 1 and 2, the battery holder or receptacle 14 is preferably of cast or moulded plastic or other rigid non-conducting material in tubular form, such as in the form of an open-ended trough, of a length to receive and hold a multiple number of the battery cells or cartridges. For this purpose the trough or holder has two inwardly curved or bowed guide or retaining walls 15 and 16, conforming to the shape of the battery units and integrally joined to a flat-bottomed base portion or strip 17 secured, in the present example, to the bottom wall of the casing, by self-tapping screws 18 or other suitable means.

The common base strip 17 is provided with a groove or slot 20 on its inner or upper face, as viewed in Figure 3, to receive in one end a flat strip conductor or spring contact element 21 having an anchor prong 22 which frictionally locks in the groove 20. The contact element 21 also has an angular contact portion 23 which stands substantially vertically as viewed in the drawing and lies across the adjacent or inner end of the battery holder or receptacle, as shown in Figure 1, to provide an inner resilient battery contacting and holding element for said receptacle. This is provided with a wire terminal connecting tap 24 for one of the battery supply leads 25 of the apparatus.

Referring now to Figure 4 along with the preceding figures, a similar wire terminal connecting tab 28 for the other battery supply lead 29 of the apparatus is provided on a reinforcing plate 30 of conducting material, such as sheet copper, which is secured, as by integral locking prongs 32, to the end wall 6 in which the port 15 is located, in an area adjacent to and surrounding the port. The reinforcing plate is provided with a circular opening 35 which aligns with the port 15 with a slight clearance and serves to strengthen and stiffen the casing wall about the port or opening 15 when applied and locked thereto as shown.

A flanged hollow battery cap 36, recessed on its inner end to receive and hold a spring contact and locking device or element 38, is provided as a detachable closure means for the loading port 15. As indicated in Figures 1 and 2, this closure means and the loading port are in one end wall, near the bottom of the casing preferably, so that the battery weight internally can stabilize the receiver when in use, against tipping. The cap closes the port 15 and the spring element 38 provides a resilient connection between the reinforcing plate and the forward terminal end of the battery group in the holder 14. The cap, preferably of molded plastic material, is circular in shape as indicated more clearly in Figures 2 and 3, and comprises a hollow cylindrical inner body 40 which fits the loading port 15 in the casing, and an integral outer circular disk or flange 41 which seats tightly against the outer face of the casing wall about the port or opening 15, as indicated in Figure 1.

The cylindrical body 40 of the cap provides a socket or holder for the spring contact and locking device 38 which is seated therein. This device or element is a conical or helical compression spring of Phosphor bronze or the like, having two diametrically opposite contact and locking loops or lugs 43 formed in a larger convolution 44 of the spring near the base or fixed end thereof which terminates in a hook or foot 45 bearing against the inner face of the cap. The lugs 43 project or extend radially through suitable diametrically opposite slots 47 provided in the cylindrical body 40 of the cap, as shown in Figures 3 and 4.

The lugs 43 provide means integral with the tapered helical or conical compression spring 38 for locking the cap 36, and also provide electrical contact with the reinforcing plate 30 about the opening 35 in the plate. Both the port 15 and the opening 35 are provided with aligned slots at diametrically opposite points, as indicated by the slots 50 in the port 15 and the slots 51 in the opening 35, to receive and pass the lugs 43, and the plate 30 is provided with a stop stud 52 integral therewith at the edge of the opening 35 in the plate. This operates to stop the upper lug 43, as viewed in the drawing, when the cap 36 is rotated clockwise, as viewed in Figure 2, into locked position.

With the battery mounting and holding means shown, the back of the case may be tightly and permanently closed, except for inspection and servicing, as by a suitable cover 55, shown in Figure 2, applied to the back opening and secured by any suitable means, thus keeping the casing closed tightly against dust and other material to which it may be subjected in use because of its portability. However, the battery elements may be changed without danger of disturbing the interior equipment and wiring, as the casing is not actually opened to replace the battery.

The cap 36 may be rotated a fraction of a turn to release the lugs 43 and is then withdrawn, with the lugs passing through the slots 50 and 51. Since the battery holder 14 is aligned axially with the opening or port 15, the old battery elements 17 may be slipped out through the opening by tipping the casing. The new battery elements are then inserted end-to-end in a manner, as indicated in Figure 1, to provide the proper polarity at the inner end or terminal which contacts the resilient strip or terminal end 23 of the inner contact element. The tapered conical tip or end contact element 56 of the spring contact and locking element 38 engages the opposite terminal end of the battery when the cap 36 is inserted and turned into locked position, as indicated in Figures 2 and 4. The spring element 38 is then compressed slightly to force the battery elements by pressure longitudinally tightly against the resilient contact element 23. The length of the holder 14 may be made shorter if a lesser number of battery elements are to be used, or it may be made longer if a greater number of elements are required for any given apparatus, thus being in length substantially a multiple of the length of one battery element. The number of units shown in Figure 1 is that for a present commercial model of a transistorized receiver requiring three 1½ volt flashlight cells or battery elements.

The construction shown provides simplified, economical and reliable means for retaining small dry batteries of the flashlight type in position in a receiver casing, and positive contact with the receiver battery circuits, with minimum liability or possibility of increased contact resistance due to wear, corrosion or careless handling of the receiver. It is particularly adapted for use with receivers having casings of semi-rigid material such as layers of leather or simulated leather as referred to in the present example. The reinforcing plate covers a substantial area about the loading port and functions as a rigid member to stiffen the casing wall against which the locking cap may be seated. At the same time, it provides an effective double contact with the closure means lugs for connecting the lead wire 29 with the large area end of the battery element with a positive pressure contact. The terminal arrangement has a further advantage that the recessed, flattened contact areas of the battery units may not make contact with the contact elements 21, since it is in the form of a narrow flat strip extending over the rear or inner end of the tubular or trough-like holder, whereby it may engage only the terminal of the end battery unit which extends forwardly of the battery top area, and is normally the positive terminal thereof. The holding means therefore is effectively polarized so that in use the apparatus will not function if the battery elements are placed in the holder in the wrong direction. Furthermore, the contact elements are readily detachable from the cap and the battery holder for replacement should they become broken or corroded in use.

In addition, the battery holder or battery loading compartment arrangement, in accordance with the invention, fits snugly along and against one wall of the interior of the casing substantially out of the way of the apparatus and equipment in the casing and requires only that a small readily controlled loading port be provided in an adjoining wall in alignment therewith, such as a convenient end wall near the bottom of the casing, as in the present example. This arrangement is of importance in small portable radio receiver apparatus and the like for the reason that space is at a premium in such equipments. It is therefore essential that the battery holder per se should take up as little space as possible to allow maximum battery space in a minimum of cabinet space. The battery holder in accordance with the invention therefore conforms to this requirement and in addition affords firm support for the battery, being secured to and along one wall of the casing.

I claim:

1. The combination with a casing for portable battery-operated electrical apparatus, of a battery loading compartment therefor comprising, an elongated tubular inner battery receptacle extending along one wall of the casing, a battery terminal contact element carried by said receptacle, means providing a circular battery loading port for the compartment in an adjoining wall of the casing in alignment with the axis of said receptacle, a contact plate of conducting material secured to said adjoining wall on the inner surface thereof in an area surrounding said port, a flanged cap-like cylindrical closure means for the port, and spring contact and locking means mounted in said closure means for resiliently engaging a battery terminal and having radial lug elements providing locking and electrical contact with said plate.

2. The combination with a casing for portable battery operated electrical apparatus, of a battery loading compartment therefor comprising, an elongated tubular inner battery receptacle extending along one wall of the casing, a resilient spring contact element carried by and extending across one end of said receptacle, means providing a circular battery loading port for the compartment in an adjoining wall of the casing in alignment with the axis of said receptacle and spaced from the other end thereof, a contact plate of conducting and reinforcing material secured to said adjoining wall on the inner surface thereof in an area surrounding said port, a flanged cap-like cylindrical closure means for the port, and spring contact and locking means mounted in said closure means and having radial lug elements integral therewith providing locking and electrical contact with said plate.

3. The combination with a casing for portable battery-operated electrical apparatus, of a battery loading compartment therefor comprising, an elongated tubular inner battery receptacle extending along and secured to one wall of the casing, a spring contact element carried by and extending across one end of said receptacle for resiliently electrically contacting and holding the battery in said receptacle, means providing a circular battery loading port for the compartment in an adjoining wall of the casing in alignment with the axis of said receptacle to convey the battery into and out of said receptacle without opening said casing, a contact plate of conducting and reinforcing material secured to said adjoining wall on the inner surface thereof in an area surrounding said port, a flanged cap-like cylindrical closure means for the port, and helical spring contact and locking means seated in said closure means for resiliently contacting the battery at the other end of the receptacle, said last named means having radial lug elements providing locking and electrical contact with said plate.

4. The combination with a casing for portable battery-operated electrical apparatus, of a battery loading compartment therefor comprising, an elongated tubular inner battery receptacle for a plurality of duplicate cell units extending along and secured to one wall of the casing, a flat spring contact element carried by and extending across one end of said receptacle for resiliently electrically contacting and holding the cell units in said receptacle, means providing a circular battery loading port for the compartment in an adjoining wall of the casing in alignment with the axis of said receptacle and closely spaced from the other end thereof to convey battery units into and out of said receptacle without opening said casing, a contact plate of conducting and reinforcing material secured to said adjoining wall on the inner surface thereof in an area surrounding said port, a flanged cap-like cylindrical closure means for the port, and helical spring contact and locking means seated in said closure means, said last named means having two radial lug elements integral with one convolution thereof providing locking and electrical contact with said plate and an end contact element for resiliently electrically contacting and applying longitudinal pressure to the cell units in said receptacle.

5. The combination with a casing for portable battery-operated electrical apparatus, of a battery loading compartment therefor comprising, an elongated tubular inner receptacle extending along one wall of the casing for receiving and holding a plurality of battery units in end-to-end contacting alignment, a flat spring contact element carried by and extending across one end of said receptacle for resiliently contacting one end terminal of the innermost battery unit, means providing a circular battery loading port for the compartment in an adjoining wall of the casing in alignment with the axis of said receptacle and closely spaced from the other end thereof for inserting and withdrawing battery units without opening the casing, a contact plate of conducting and reinforcing material secured to said adjoining wall on the inner surface thereof in an area surrounding said port, a flanged cap-like cylindrical closure means for the port, spring contact and locking means mounted in said closure means having a spring element for resiliently contacting one end terminal of the outermost battery unit and radial lug elements integral with the spring element providing locking and electrical contact with said plate, and supply leads in said casing connected with said contact element and said contact plate.

6. The combination with a portable radio receiver casing, of a battery loading compartment therefor comprising, an elongated tubular inner battery receptacle secured to and along one fixed wall of the casing, a resilient spring contact element carried by and extending across one end of said receptacle, means providing a circular port in a second fixed wall of the casing in alignment with the axis of said receptacle and spaced from the other end thereof for loading and unloading battery units in said receptacle, a contact plate of conducting and reinforcing material secured to said adjoining wall on the inner surface thereof in an area surrounding said port, a flanged hollow battery cap for the port seated against the outer surface of said second wall about the port, a helical spring contact and locking device in said cap having two integral radial lugs providing locking and electrical contact with said plate, and supply leads in said casing connected with said contact element and said plate.

7. The combination with a portable radio receiver casing, of a battery loading compartment therefor comprising, an elongated inner battery receptacle for a plurality of duplicate cell units, said receptacle being of open-ended trough-like form secured to and along one wall of the casing and having bowed retaining walls conforming to the shape of said units, a flat resilient spring contact element carried by and extending across an inner end of said receptacle, means providing a circular battery loading port in an adjoining wall of the casing in alignment with the axis of said receptacle and spaced from the other and outer end thereof, a contact plate of conducting and reinforcing material secured to said adjoining wall on the inner surface thereof in an area surrounding said port, a cap-like closure means for the port having an inner hollow cylindrical body fitting the port and an outer circular flange seated against the outer surface of said adjoining wall about the port, a helical spring contact and locking device mounted in the body of said closure means having two radial lugs integral with one convolution thereof providing locking and electrical contact with said plate, and supply leads in said casing connected with said contact element and said plate.

8. The combination with a portable radio receiver casing having a main closure means for an inspection and servicing opening therein, of a battery loading compartment therefor comprising, an elongated inner battery receptacle of open-ended trough-like form having a base portion secured to and along one fixed wall of the casing and two inwardly bowed retaining walls adjoined to said base portion, a flat resilient spring contact element carried by and extending across an inner end of said receptacle, means providing a circular port in a second fixed wall of the casing in alignment with the axis of said receptacle and spaced from the other and outer end thereof for loading and unloading battery units in said receptacle without opening said casing at said main closure means, a contact plate of conducting and reinforcing material secured to said adjoining wall on the inner surface thereof in an area surrounding said port, a flanged hollow battery cap for the port seated in said port and against the outer surface of said second wall about the port, a helical spring contact and locking device in said cap having two radial lugs integral with one convolution thereof providing locking and electrical contact with said plate, and supply leads in said casing connected with said contact element and said plate.

9. The combination with a casing for portable battery-operated electrical apparatus, of a battery loading compartment therefor, comprising an elongated tubular inner receptacle extending along and secured to one wall of the casing of a diameter to freely receive and hold a plurality of battery units in end-to-end contacting alignment, a flat spring contact element detachably anchored in and extending across an inner end of said receptacle for resiliently contacting one end terminal of the innermost battery unit, means providing a circular loading port for the compartment in an adjoining wall of the casing in alignment with the axis of said receptacle and closely spaced from the opposite and outer end thereof for inserting new battery units in and withdrawing used battery units from the receptacle without opening the casing, said port being of a diameter slightly larger than that of a battery unit, a contact plate of conducting and reinforcing material secured to said adjoining wall on the inner surface thereof in an area surrounding said port, a flanged cap-like cylindrical closure means for the port, a tapered helical spring contact and locking device mounted in said closure means having two radial lug elements integral therewith providing locking and electrical contact with said plate, and supply leads in said casing connected with said contact element and said plate.

10. The combination with a casing for portable battery-operated electrical apparatus, of a battery loading compartment therefor comprising, means providing an elongated inner battery receptacle extending along one wall of the casing, a battery terminal contact element for said receptacle, means providing a circular battery loading port for the compartment in an adjoining wall of the casing in alignment with the axis of said receptacle, a contact plate of conducting material on the inner surface of said adjoining wall in an area surrounding said port, a cap-like cylindrical closure means for the port, and spring contact and locking means mounted in said closure means for resiliently engaging a battery terminal and having radial lug elements providing locking and electrical contact with said plate.

11. The combination with a casing for portable battery-operated electrical apparatus, of a battery loading compartment therefor comprising, means providing an elongated inner battery receptacle extending along one wall of the casing, a spring contact element extending across at one end of said receptacle for resiliently electrically contacting and holding a battery in said receptacle, means providing a circular battery loading port for the compartment in an adjoining wall of the casing in alignment with the axis of said receptacle at the other end thereof to convey the battery into and out of said receptacle without opening said casing, a contact plate of conducting material on the inner surface of said adjoining wall in an area surrounding said port, a cap-like cylindrical closure means for the port, and spring contact and locking means seated in said closure means for resiliently contacting the battery at said other end of the receptacle, said last named means having radial lug elements providing locking and electrical contact with said plate.

12. The combination with a portable radio receiver casing, of a battery loading compartment therefor comprising, elongated inner battery receptacle means extending along one wall of the casing, a resilient spring contact element extending across one end of said receptacle, means providing a circular battery loading port in a second wall of the casing in alignment with the axis of said receptacle means and spaced from the other end thereof, a contact plate of conducting material on the inner surface of said second wall in an area surrounding said port, a cylindrical hollow closure cap for the port, a spring contact and locking device in said cap having two radial lug elements providing locking and electrical contact with said plate, and power supply leads in said casing connected with said contact element and said plate.

13. The combination with a casing for portable battery-operated electrical apparatus, of a battery loading compartment therefor comprising, means providing an elongated tubular inner receptacle extending along one wall of the casing of a diameter to freely receive and hold a plurality of battery units in end-to-end contacting alignment, a flat spring contact element extending across an inner end of said receptacle for resiliently contacting one end terminal of the innermost battery unit, means providing a circular loading port for the compartment in an adjoining wall of the casing in alignment with the axis of said receptacle and closely spaced from the opposite and outer end thereof for inserting new battery units in and withdrawing used battery units from the receptacle without opening the casing, said port being of a diameter slightly larger than that of a battery unit, a contact plate of conducting material on the inner surface of said adjoining wall in an area surrounding said port, a flanged cap-like cylindrical closure means for the port, a tapered helical spring contact and locking device mounted in said closure means having two radial lug elements integral therewith providing locking and electrical contact with said plate, and power supply leads in said casing connected with said contact element and said plate.

No references cited.